United States Patent
Hasegawa et al.

(10) Patent No.: US 11,531,938 B2
(45) Date of Patent: Dec. 20, 2022

(54) INFORMATION PROCESSING DEVICE AND MOBILE OBJECT

(71) Applicant: TOYOTA JIDOSHA KABUSHIKI KAISHA, Toyota (JP)

(72) Inventors: Hideo Hasegawa, Nagoya (JP); Tadahiro Kashiwai, Nagoya (JP); Yusuke Kaneko, Toyota (JP); Akihiro Yamaguchi, Toyota (JP); Yuki Ito, Iwakura (JP); Naoki Uenoyama, Nisshin (JP); Takahiro Shiga, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 420 days.

(21) Appl. No.: 16/738,291

(22) Filed: Jan. 9, 2020

(65) Prior Publication Data
    US 2020/0250599 A1    Aug. 6, 2020

(30) Foreign Application Priority Data
    Feb. 6, 2019  (JP) .............. JP2019-019955

(51) Int. Cl.
    *G06Q 10/06*   (2012.01)
    *G06Q 10/02*   (2012.01)

(52) U.S. Cl.
    CPC ....... *G06Q 10/06311* (2013.01); *G06Q 10/02* (2013.01)

(58) Field of Classification Search
    CPC .................. G06Q 10/06311; G06Q 10/02
    USPC ........................................................ 705/5
    See application file for complete search history.

(56) References Cited

U.S. PATENT DOCUMENTS

| 10,664,915 B1* | 5/2020 | Copeland ........... G06Q 30/0641 |
| 2002/0087367 A1* | 7/2002 | Azani .................... G06Q 10/02 705/5 |
| 2011/0158207 A1* | 6/2011 | Alberth, Jr. .......... G06Q 10/109 370/338 |
| 2012/0179498 A1* | 7/2012 | Aharoni ................ G06Q 10/02 705/5 |

(Continued)

FOREIGN PATENT DOCUMENTS

| CN | 1733542 A | 2/2006 |
| JP | 2017-182137 A | 10/2017 |
| JP | 6372606 B1 | 8/2018 |

OTHER PUBLICATIONS

"A general framework for modeling shared autonomous vehicles with dynamic network-loading and dynamic ride-sharing application" Published by Elsevier (Year: 2017).*

*Primary Examiner* — Zeina Elchanti
(74) *Attorney, Agent, or Firm* — Oblon, McClelland, Maier & Neustadt, L.L.P.

(57) ABSTRACT

An information processing device that controls a mobile object including lodging equipment with a plurality of compartments performs: creating an operation schedule including a first period in which movement for allowing a plurality of users to ride in or alight from the mobile object is a main purpose and a second period in which riding and alighting of the users are not required based on lodging requests acquired from the plurality of users; and generating an operation instruction for executing different controls on the mobile object in the first period and the second period and transmitting the operation instruction to the corresponding mobile object.

9 Claims, 8 Drawing Sheets

(56) References Cited

U.S. PATENT DOCUMENTS

| | | | |
|---|---|---|---|
| 2018/0060827 A1* | 3/2018 | Abbas | G06Q 10/1095 |
| 2019/0195645 A1 | 6/2019 | Terahata et al. | |
| 2019/0212158 A1* | 7/2019 | Gordon | G01C 21/3415 |
| 2020/0016997 A1* | 1/2020 | Sato | B60N 2/0244 |
| 2020/0342763 A1* | 10/2020 | Arima | G06Q 50/30 |
| 2020/0398690 A1* | 12/2020 | Lee | B60L 53/51 |
| 2021/0108934 A1* | 4/2021 | Dasalukunte | G01C 21/3461 |
| 2022/0053531 A1* | 2/2022 | Sengupta | H04W 72/0446 |
| 2022/0088428 A1* | 3/2022 | Moix Olivé | A62C 35/68 |

\* cited by examiner

FIG. 5

LODGING REQUEST

| ID | USER ID | DESIRED RIDING POINT | DESIRED RIDING TIME | DESIRED ALIGHTING POINT | DESIRED ALIGHTING TIME |
|---|---|---|---|---|---|
| 1 | U001 | NODE B | 7/1/2019 22:00-22:30 | NODE F | 8/1/2019 7:30-8:30 |
| 2 | U002 | NODE C | 7/1/2019 22:45-23:15 | NODE G | 8/1/2019 8:00-8:30 |
| 3 | U003 | NODE D | 7/1/2019 22:45-23:00 | NODE H | 8/1/2019 8:00-8:30 |
| ... | ... | ... | ... | ... | ... |

FIG. 8

(A) OPERATION INSTRUCTION

| | |
|---|---|
| OPERATION INSTRUCTION 1 | USER U001 RIDES AT NODE B AT 22:30<br>USER U002 RIDES AT NODE C AT 22:45<br>USER U003 RIDES AT NODE D AT 23:00 |
| OPERATION INSTRUCTION 2 | TRAVEL 30 km WHILE DISPLAYING PREDETERMINED ADVERTISEMENT IN PRESCRIBED AREA<br>THEREAFTER, PARK AT NODE E UP TO 7:00 |
| OPERATION INSTRUCTION 3 | USER U001 ALIGHTS AT NODE F AT 7:45<br>USER U002 ALIGHTS AT NODE G AT 8:15<br>USER U003 ALIGHTS AT NODE H AT 8:30 |

(B) OPERATION PLAN CORRESPONDING TO OPERATION INSTRUCTION 1

| | |
|---|---|
| 1 | TRAVEL FROM NODE A TO NODE B (TARGET TIME 22:30) |
| 2 | TRANSMIT NOTIFICATION TO USER U001 IN THE VICINITY OF NODE B |
| 3 | ALLOW USER U001 TO RIDE AND PERFORM CHECK-IN PROCESS |
| 4 | TRAVEL FROM NODE B TO NODE C (TARGET TIME 22:45) |
| 5 | TRANSMIT NOTIFICATION TO USER U002 IN THE VICINITY OF NODE C |
| 6 | ALLOW USER U002 TO RIDE AND PERFORM CHECK-IN PROCESS |
| 7 | TRAVEL FROM NODE C TO NODE D (TARGET TIME 23:00) |
| 8 | TRANSMIT NOTIFICATION TO USER U003 IN THE VICINITY OF NODE D |
| 9 | ALLOW USER U003 TO RIDE AND PERFORM CHECK-IN PROCESS |

INFORMATION PROCESSING DEVICE AND MOBILE OBJECT

INCORPORATION BY REFERENCE

The disclosure of Japanese Patent Application No. 2019-019955 filed on Feb. 6, 2019 including the specification, drawings and abstract is incorporated herein by reference in its entirety.

BACKGROUND

1. Technical Field

The disclosure relates to a lodging service using a mobile object.

2. Description of Related Art

Provision of a service using a mobile object has been studied. For example, by sending an autonomous mobile object serving as a sharing vehicle to a user, it is possible to provide a mobility service. As described in Japanese Patent No. 6372606 (JP 6372606 B), a technique of providing a lodging facility to a mobile object and providing both a lodging service and a mobility service has been proposed.

SUMMARY

When a lodging service is provided using a mobile object, unlike a general ride-sharing vehicle, the mobile object needs to be scheduled such that desired alighting places and desired alighting times are satisfied in addition to riding places and riding times of users. On the other hand, while a user is sleeping, the position of the mobile object or the like is not limited. In this way, in a mobile object that provides a lodging service to a plurality of users, it is necessary to determine a traveling schedule thereof using a method other than that of normal ride-sharing.

The disclosure is for optimizing an operation schedule of a mobile object that provides a lodging service.

According to an aspect of the disclosure, there is provided an information processing device that controls a mobile object including lodging equipment with a plurality of compartments, the information processing device including a control unit configured to perform: creating an operation schedule including a first period in which movement for allowing a plurality of users to ride in or alight from the mobile object is a main purpose and a second period in which riding and alighting of the users are not required based on lodging requests acquired from the plurality of users; and generating an operation instruction for executing different controls on the mobile object in the first period and the second period and transmitting the operation instruction to the corresponding mobile object.

According to another aspect of the disclosure, there is provided a mobile object that includes lodging equipment with a plurality of compartments and operates based on an operation instruction which is received from a server, the mobile object including a control unit configured to perform: receiving the operation instruction from the server; and allowing a plurality of users to ride in the mobile object and traveling based on the received operation instruction, wherein the control unit is configured to execute different controls in a first period in which movement for allowing the plurality of users to ride in or alight from the mobile object is a main purpose and a second period in which riding and alighting of the users are not required.

Still other aspects of the disclosure can be embodied as an information processing method which is performed by the information processing device or the mobile object, a program causing a computer to perform the information processing method, or a computer-readable storage medium that non-transitorily stores the program.

According to the aspects of the disclosure, it is possible to optimize an operation schedule of a mobile object that provides a lodging service.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is a diagram illustrating an example of lodging requests in the first embodiment;

FIG. 8 is a diagram illustrating an example of an operation instruction and an operation plan in the first embodiment.

DETAILED DESCRIPTION OF EMBODIMENTS

Figure 1:
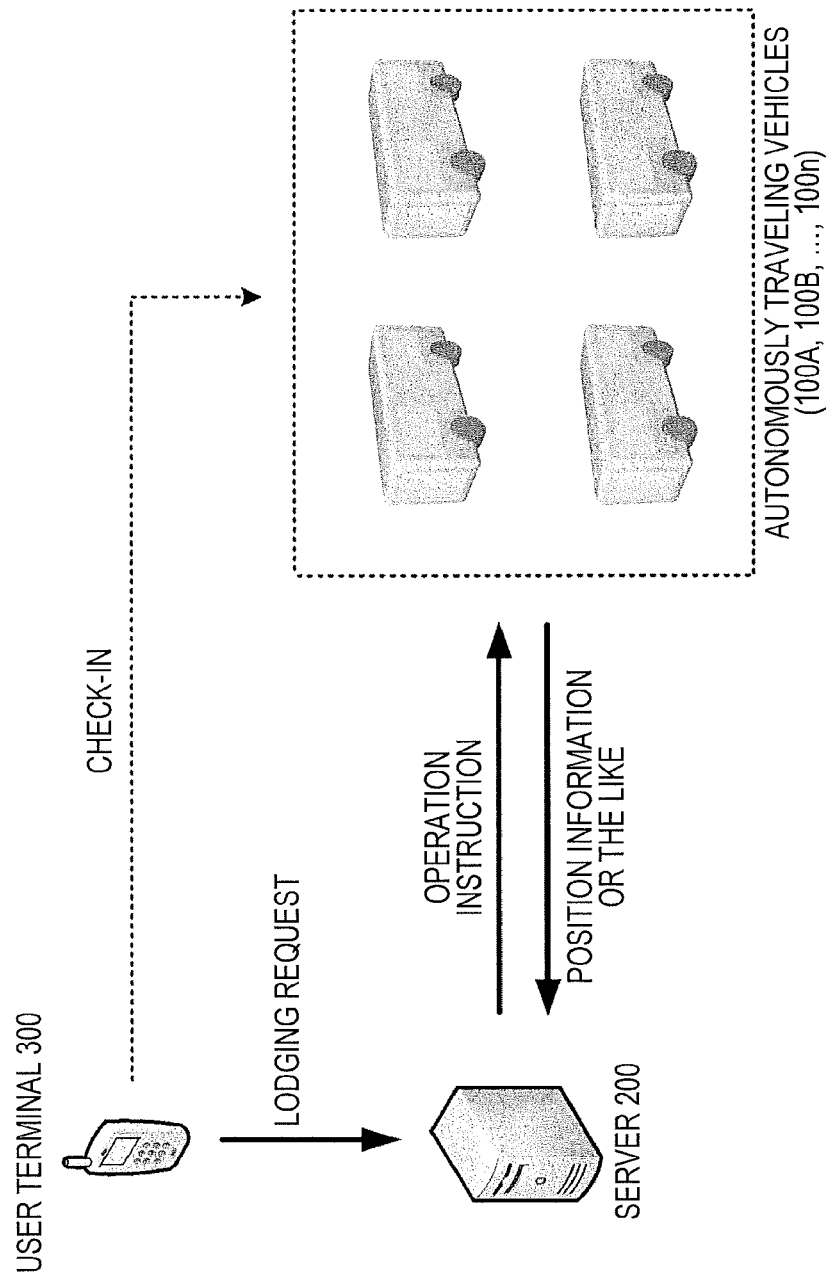
FIG. 1 is a diagram schematically illustrating a mobile object system according to a first embodiment.

An aspect in which a lodging service is provided using a vehicle that includes a lodging facility and that can travel autonomously is conceivable. For example, by providing lodging equipment such as cabins of a capsule type in an autonomously traveling vehicle, both of a mobility service and a lodging service can be provided.

On the other hand, when a lodging service is provided to a plurality of users using a vehicle, it is important how an operation schedule of the vehicle is created. Particularly, when mobility and lodging are simultaneously provided, a check-out time (that is, a desired alighting time) differs for each user and thus additional limitations may be added in comparison with simple movement. On the other hand, after all users have ridden in the vehicle, movement of the vehicle is not necessary until the first user alights the next morning. In this way, in order to control a vehicle which is specialized in lodging, it is necessary to use a method other than that of ride-sharing.

An information processing device (a server) according to an embodiment is an information processing device that controls a mobile object including lodging equipment with a plurality of compartments. Specifically, the information processing device includes a control unit configured to perform: creating an operation schedule including a first period in which movement for allowing a plurality of users to ride in or alight from the mobile object is a main purpose and a second period in which riding and alighting of the users are not required based on lodging requests acquired from the plurality of users; and generating an operation instruction for executing different controls on the mobile object in the first period and the second period and transmitting the operation instruction to the corresponding mobile object. A mobile object according to the embodiment includes a control unit configured to perform: receiving the operation instruction from the server; and allowing a plurality of users to ride in the mobile object and traveling based on the received operation instruction. The control unit is configured to execute different controls in a first period in which movement for allowing the plurality of users to ride in or alight from the mobile object is a main purpose and a second period in which riding and alighting of the users are not required.

The information processing device according to the embodiment creates an operation schedule for a mobile object based on lodging requests acquired from a plurality of users and generates an operation instruction for causing the mobile object to operate according to the operation schedule.

The operation schedule includes a first period and a second period. The first period is a period in which movement for allowing a plurality of users to ride in or alight from a vehicle is a main purpose. For example, a period from a time at which the vehicle moves to pick up a first user to a time at which a final user rides in the vehicle may be set as the first period. The second period is a period in which riding and alighting of a user is not required. For example, a period from a time at which the final user rides in the vehicle to a time at which the vehicle moves to a point at which a first user alights from the vehicle the next morning may be set as the second period.

The control unit executes different controls in the first period and the second period. For example, the control unit may perform different tasks or may change parameters which are associated with operation or parameters which are used in automated driving. Accordingly, for example, an operation mode in which the same operation as in normal ride-sharing is performed in the first period and another service not affecting the lodging service is provided to the outside in the second period is possible. In the second period, it is possible to perform traveling with less shaking. The first period and the second period may be designated by the information processing device (the server) or may be determined by the mobile object.

The second period may be included in a period until a first user out of the plurality of users alights from the mobile object on the next day after a final user has ridden in the mobile object. That is, the second period may be a period in which the users sleep.

The control unit may be configured to generate the operation instruction for designating an operation speed which is lower in the second period than in the first period. In the second period, the users can be considered to be asleep, and thus the mobile object may travel at a speed which is lower than in the first period in order to give priority to comfort. Designating of the low operation speed includes, for example, setting a maximum speed to be lower or setting an average speed to be lower in automated driving.

The mobile object may include equipment that provide a service other than lodging equipment, and the control unit may be configured to generate the operation instruction for causing the mobile object to additionally perform the service other than lodging in the second period.

In the second period, the users can be considered to be asleep, and thus a traveling position of the mobile object or the like is not limited. Accordingly, the mobile object can further perform a service other than lodging, such as a street monitoring service.

The control unit may be configured to acquire the lodging requests including a desired riding point, a desired alighting point, and a desired alighting time from the plurality of users and to create the operation schedule satisfying all the lodging requests.

Each of the plurality of compartments of the lodging equipment may be able to be unlocked based on a result of communication with a user terminal correlated with each of the plurality of users. For example, each compartment (each private room or the like) of the lodging equipment may be locked or unlocked using the terminal of a user who has requested the lodging service.

First Embodiment

An outline of a mobile object system according to a first embodiment will be described below with reference to FIG. 1. The mobile object system according to this embodiment includes a plurality of autonomously traveling vehicles 100A, . . . 100n that travel autonomously based on a given instruction, a server 200 that issues the instruction, and a user terminal 300. Each autonomously traveling vehicle 100 is an automatically driven vehicle that provides a lodging service, and the server 200 is a device that manages a plurality of autonomously traveling vehicles 100. The user terminal 300 is a terminal which is carried by a user who uses the lodging service. Hereinafter, when a plurality of autonomously traveling vehicles are not individually distinguished from each other, the autonomously traveling vehicles are simply referred to as autonomously traveling vehicles 100.

The autonomously traveling vehicles 100 are multi-purpose mobile objects which may have different functions and are vehicles which can travel on a road by automated driving and unmanned driving. The autonomously traveling vehicles 100 in this embodiment are so-called lodging type vehicles including lodging equipment in vehicle bodies thereof. Each autonomously traveling vehicle 100 includes, for example, a plurality of compartments of which each is a cabin of a private room (capsule) type and which a user can ride. Each autonomously traveling vehicle 100 is also referred to as an electric vehicle (EV) pallet. The autonomously traveling vehicle 100 is not necessarily an unmanned vehicle. For example, occupants such as sales staff, service staff, or security personnel may be in the autonomously traveling vehicle 100. The autonomously traveling vehicle 100 may not be a vehicle that can travel completely autonomously. For example, the autonomously traveling vehicle 100 may be a vehicle which is driven by a person or of which driving assistance is provided by a person depending on the situation. In this embodiment, the autonomously traveling vehicle 100 has a function of receiving a request from a user, responding to the user, performing a predetermined process in response to the request from the user, and reporting a result of the process. For example, the autonomously traveling vehicle 100 may perform a check-in process for lodging equipment or a process of locking/unlocking a designated compartment. Out of requests from users, a request which cannot be performed by the autonomously traveling vehicle 100 alone may be transmitted to the server 200 and may be processed in cooperation with the server 200.

The server 200 is a device that instructs the autonomously traveling vehicles 100 to operate. In this embodiment, the server 200 acquires requests for use of an autonomously traveling vehicle 100 (hereinafter referred to as lodging requests) from user terminals 300 which are carried by a plurality of users, determines an operation schedule of the autonomously traveling vehicle 100, and instructs the autonomously traveling vehicle 100 to operate.

An operation schedule is, for example, data including a time (a time period) at which each user rides in a vehicle, a place at which each user rides in the vehicle, the order in which the users ride in the vehicle, a time (a time period) at which each user alights from the vehicle, and a place at which each user alights from the vehicle. An operation instruction is an instruction for an autonomously traveling vehicle 100 to cause the autonomously traveling vehicle 100 to operate in accordance with an operation schedule. The server 200 generates an operation instruction instructing to travel while allowing users to ride in and alight from a vehicle in accordance with the operation schedule based on the determined operation schedule and transmits the generated operation instruction to the autonomously traveling vehicle 100. Accordingly, the autonomously traveling vehicle 100 can provide a mobility service and a lodging service to users. The operation instruction may include instructions which are not directly associated with movement. For example, the operation instruction may include an instruction "to transmit an arrival notification to a user in the vicinity of the user."

Figure 2:
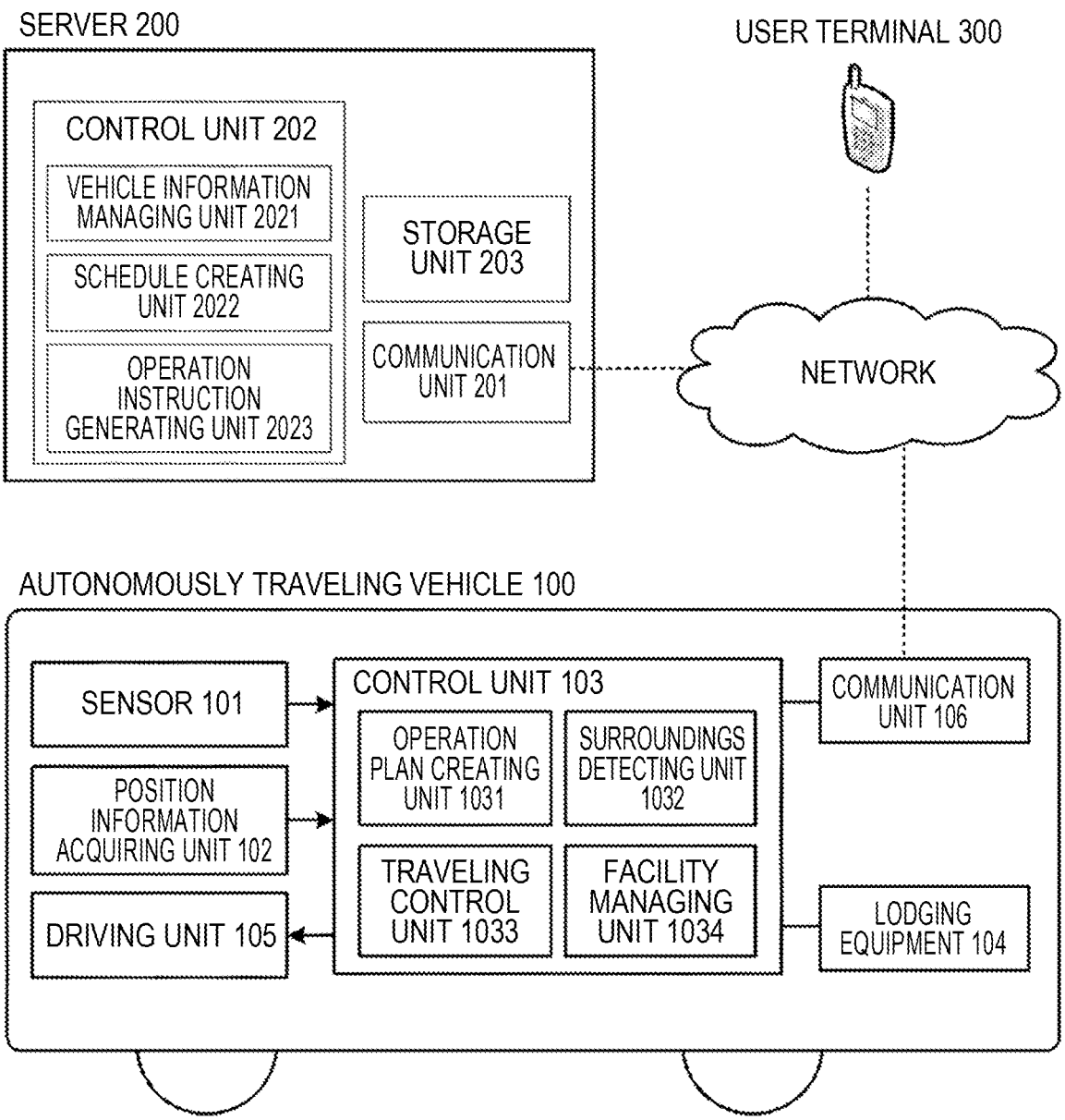
FIG. 2 is a block diagram schematically illustrating an example of elements of the system.

Elements of the system will be described below in detail. FIG. 2 is a block diagram schematically illustrating an example of the configurations of each autonomously traveling vehicle 100 and the server 200 illustrated in FIG. 1.

An autonomously traveling vehicle 100 includes a sensor 101, a position information acquiring unit 102, a control unit 103, lodging equipment 104, a driving unit 105, and a communication unit 106. The autonomously traveling vehicle 100 operates with electric power which is supplied from a battery which is not illustrated.

The sensor 101 is a unit that senses surroundings of the vehicle and typically includes a laser scanner, a LIDAR, and a radar. Information which is acquired by the sensor 101 is transmitted to the control unit 103. The sensor 101 may include a camera which is installed in a vehicle body of the autonomously traveling vehicle 100. For example, an image sensor such as a charge-coupled device (CCD), a metal-oxide-semiconductor (MOS) or a complementary metal-oxide-semiconductor (CMOS) can be used.

The position information acquiring unit 102 is a unit that acquires a current position of a vehicle and typically includes a GPS receiver. Information which is acquired by the position information acquiring unit 102 is transmitted to the control unit 103.

The control unit 103 is a computer that controls the autonomously traveling vehicle 100 based on information acquired from the sensor 101. The control unit 103 is constituted, for example, by a microcomputer.

The control unit 103 includes an operation plan creating unit 1031, a surroundings detecting unit 1032, a traveling control unit 1033, and a facility managing unit 1034 as functional modules. The functional modules may be embodied by causing a central processing unit (CPU) (not illustrated) to execute a program stored in a storage unit such as a read only memory (ROM) (not illustrated).

The operation plan creating unit 1031 acquires an operation instruction from the server 200 and creates an operation plan of a host vehicle. In this embodiment, an operation plan is data in which a route on which the autonomously traveling vehicle 100 travels and processes which are to be performed by the autonomously traveling vehicle 100 on a part or all of the route are defined. Examples of the data which is included in the operation plan are as follows.

(1) Data Indicating Route on which Host Vehicle Travels

A route on which the host vehicle travels may be designated by an operation instruction or may be generated by the operation plan creating unit 1031 based on information included in the operation instruction (for example, a plurality of points at which users ride and alight, the circulation order of the points, and scheduled arrival times). When a route is generated by the autonomously traveling vehicle 100, for example, the route may be generated using map data stored in a storage unit which is not illustrated may be generated using an external service. A route can be expressed, for example, by a set of road links.

(2) Data to be Processed by Host Vehicle at Points on Route

Examples of processes which are to be performed by the host vehicle include "allowing a user to ride and performing a check-in process," "performing a check-out process and allowing a user to alight," and "transmitting a notification to a user," but are not limited thereto. The operation plan which is created by the operation plan creating unit 1031 is transmitted to the traveling control unit 1033 which will be described later.

The surroundings detecting unit 1032 detects surroundings of the vehicle based on data acquired by the sensor 101. Examples of a detection target include the number or positions of lanes, the number or positions of vehicles which are located near the host vehicle, the number or positions of obstacles (for example, a pedestrian, a bicycle, a structure, or a building) which are located near the host vehicle, structures of roads, and road signs, but are not limited thereto. The detection target is not particularly limited as long as it is required for autonomous traveling. The surroundings detecting unit 1032 may track a detected object. For example, a relative speed of an object may be calculated based on a difference between the coordinates of the object which are previously detected and the current coordinates of the object. Data on the surroundings (hereinafter referred to as "surroundings data") which is detected by the surroundings detecting unit 1032 is transmitted to the traveling control unit 1033 which will be described later.

The traveling control unit 1033 controls traveling of the host vehicle based on the operation plan created by the operation plan creating unit 1031, the surroundings data generated by the surroundings detecting unit 1032, and the position information of the host vehicle acquired by the position information acquiring unit 102. For example, the host vehicle is caused to travel such that the host vehicle travels along a predetermined route and an obstacle does not enter a predetermined safety area centered on the host vehicle. Any known method can be employed as the method of causing the vehicle to travel autonomously.

The facility managing unit 1034 causes the autonomously traveling vehicle 100 to serve as a lodging facility by controlling the lodging equipment 104 which will be described later. For example, the facility managing unit 1034 may perform a check-in/check-out process by communicating with a user terminal or may perform a process of authenticating the user terminal and unlocking a compartment corresponding to a user based on the result of authentication.

The lodging equipment 104 includes a plurality of facilities for allowing the autonomously traveling vehicle 100 to serve as a lodging facility. Examples of the lodging equipment 104 include a plurality of cabins of a private room type including a plurality of compartments, a unit for locking the compartments, a unit for interaction with a user, and a unit for communication with a user terminal, but are not limited thereto.

The driving unit 105 is a unit that causes the autonomously traveling vehicle 100 to travel based on an instruction which is generated by the traveling control unit 1033. The driving unit 105 includes, for example, a motor or an inverter for driving vehicle wheels, a brake, a steering mechanism, and a secondary battery. The communication unit 106 is a communication unit that connects the autonomously traveling vehicle 100 to a network. In this embodiment, the communication unit 106 can communicate with another device (for example, the server 200) via a network using a mobile communication service such as 3G or LTE. The communication unit 106 may additionally include a communication unit for vehicle-to-vehicle communication with another autonomously traveling vehicle 100.

The server 200 will be described below. The server 200 is a device that manages a plurality of autonomously traveling vehicles 100 and generates and transmits operation instructions for the autonomously traveling vehicles 100. The server 200 includes a communication unit 201, a control unit 202, and a storage unit 203. The communication unit 201 is a communication interface that performs the same communication as the communication unit 106 with an autonomously traveling vehicle 100 via a network.

The control unit 202 is a unit that takes charge of control of the server 200. The control unit 202 is constituted, for example, by a CPU. The control unit 202 includes a vehicle information managing unit 2021, a schedule creating unit 2022, and an operation instruction generating unit 2023 as functional modules. The functional modules may be embodied by causing a CPU (not illustrated) to execute a program stored in a storage unit such as a ROM (not illustrated).

The vehicle information managing unit 2021 manages a plurality of autonomously traveling vehicles 100 under its charge. Specifically, the vehicle information managing unit 2021 receives position information, route information, and event information from a plurality of autonomously traveling vehicles 100 at intervals of a predetermined period and stores the received information in the storage unit 203 which will be described later in correlation with times. The position information is information indicating a current position of an autonomously traveling vehicle 100, and the route information is information on a route on which the autonomously traveling vehicle 100 travels. The event information is information on events (for example, a user's check-in or check-out) which occur in the autonomously traveling vehicle 100 in operation. The vehicle information managing unit 2021 maintains and updates data on characteristics of the autonomously traveling vehicles 100 if necessary. This information is stored as vehicle information in the storage unit 203.

Examples of vehicle information include an identifier, an application or model, a type, a vehicle body size, a loading capacity, the number of persons that can be accommodated, a travelable distance in a fully charged state, a travelable distance at a current time point, and a current status (such as standby, empty, occupied, traveling, or open) of an autonomously traveling vehicle 100, but are not limited thereto. For example, the vehicle information managing unit 2021 may store information on a type of lodging equipment, the number of compartments, and a service provision capability which are provided by each autonomously traveling vehicle 100.

The schedule creating unit 2022 creates an operation schedule of an autonomously traveling vehicle 100 based on lodging requests acquired from users. A lodging request is generated by a user terminal 300 which is carried by a user and is transmitted to the server 200. For example, a reservation application which operates in the user terminal 300 acquires a desired riding point, a desired riding time (time period), a desired alighting point, and a desired alighting time (time period) from a user and transmits the acquired information to the server 200 (the schedule creating unit 2022). The schedule creating unit 2022 processes a plurality of lodging requests which are acquired from users and creates an operation schedule of an autonomously traveling vehicle 100 satisfying the lodging requests. The number of autonomously traveling vehicles 100 which operate in accordance with the operation schedule may be two or more.

The operation instruction generating unit 2023 generates an operation instruction which is to be transmitted to an autonomously traveling vehicle 100 based on the operation schedule created by the schedule creating unit 2022.

The storage unit 203 is a unit that stores information and is constituted by a storage medium such as a RAM, a magnetic disk, or a flash memory.

Figure 3:
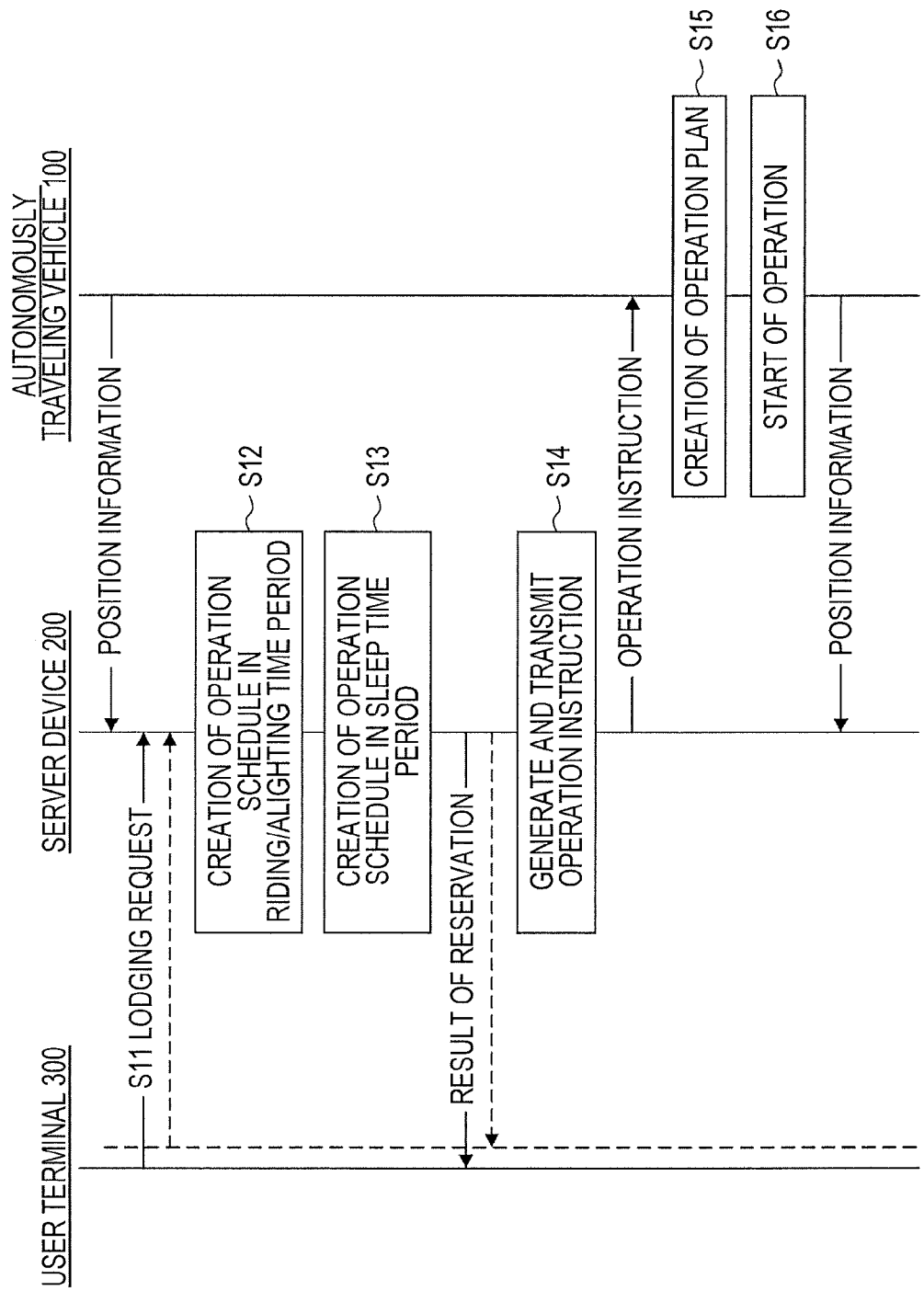
FIG. 3 is a flow diagram illustrating a flow of data between the elements of the system.
Figure 4:
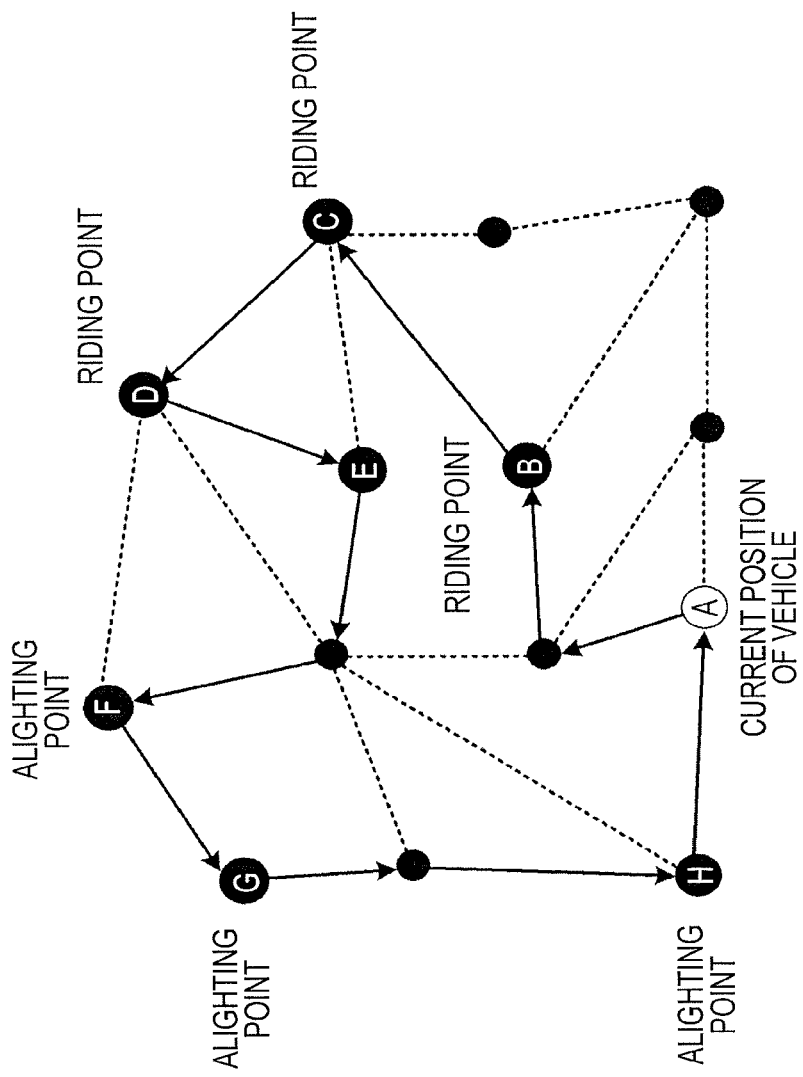
FIG. 4 is a diagram illustrating an example of a road network in the first embodiment.

Processes which are performed by the above-mentioned elements will be described below. FIG. 3 is a flow diagram illustrating a flow of processes in which the server 200 generates an operation instruction based on lodging requests received from user terminals 300 which are carried by users and an autonomously traveling vehicle 100 starts operation. In this example, it is assumed that the road network illustrated in FIG. 4 is operated by an autonomously traveling vehicle 100.

The autonomously traveling vehicle 100 periodically transmits position information to the server 200. For example, in the example illustrated in FIG. 4, an autonomously traveling vehicle 100 notifies the server 200 that the autonomously traveling vehicle 100 is located at node A, and the vehicle information managing unit 2021 stores the autonomously traveling vehicle 100 and node A in the storage unit 203 in correlation with each other. The position information may not be necessarily position information of the node. For example, the position information may be information for identifying a node or a link. A link may be divided into a plurality of sections. The road network may not be necessarily expressed by nodes and links. When the autonomously traveling vehicle 100 moves, the position information is updated from time to time.

Although not illustrated in FIG. 3, the autonomously traveling vehicle 100 may transmit information other than the position information to the server 200. For example, when the autonomously traveling vehicle 100 is operating, the autonomously traveling vehicle 100 may transmit information indicating an operation route thereof (route information, list of transit points, and a scheduled arrival time at each transit point) to the server 200. The autonomously traveling vehicle 100 may transmit event information to the server 200. Event information is, for example, information in which events which can occur in operation such as a user's riding/alighting, check-in, and check-out are described. The event information may be transmitted at a time at which the corresponding event occurs.

In Step S11, the server 200 (the schedule creating unit 2022) acquires a lodging request from a user terminal 300. The lodging request is generated, for example, by a reservation application which operates in the user terminal 300 and is transmitted to the server 200 via a network. FIG. 5 is a diagram illustrating fields which are included in the lodging request. As illustrated in FIG. 5, the lodging request includes information on a user ID, a desired riding point, a desired riding time, a desired alighting point, and a desired alighting time, and the like. The desired riding/alighting time may be expressed by a time period with a predetermined time width (for example, 30 minutes).

Figure 6:
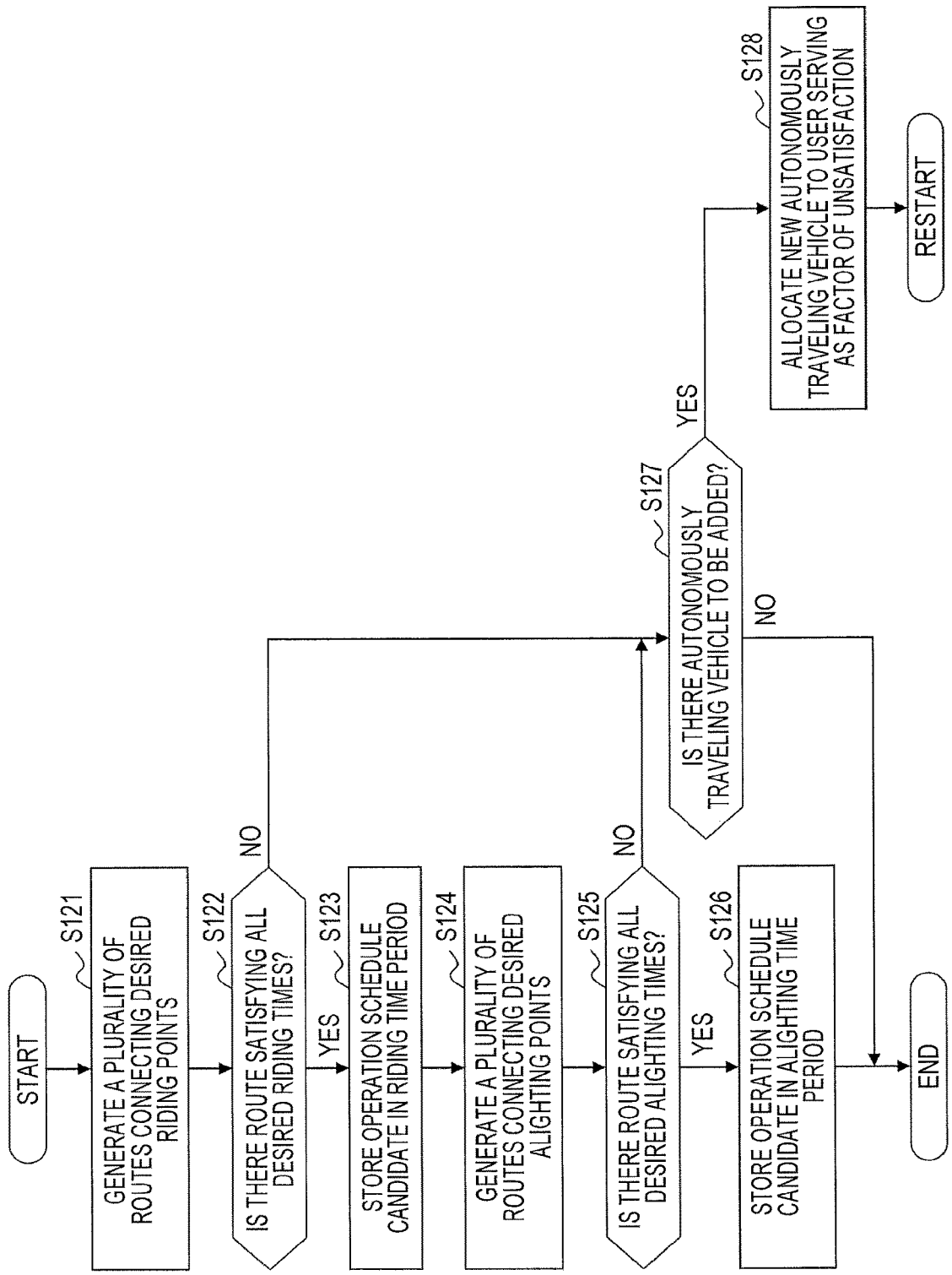
FIG. 6 is a flowchart illustrating a process routine which is performed by a server in the first embodiment.

When a predetermined number of lodging requests are received from a plurality of users or a predetermined time comes in, the server 200 (the schedule creating unit 2022) starts creation of an operation schedule (Step S12). In Step S12, an operation schedule for allowing a plurality of users to ride and an operation schedule for allowing a plurality of users to alight are created. FIG. 6 is a flowchart specifically illustrating a process which is performed in Step S12 by the schedule creating unit 2022.

First, in Step S121, a plurality of routes connecting a plurality of designated riding points is generated with reference to a plurality of lodging requests acquired from the user terminals 300. In this step, the routes may be generated in a round-robin manner or only routes satisfying predetermined conditions (for example, a total traveling distance is equal to or less than a predetermined value) may be generated. Then, in Step S122, it is determined whether there is a route on which an autonomously traveling vehicle 100 arrives at all the desired riding points at designated times out of the plurality of routes generated in Step S121 with reference to the desired riding times correlated with the desired riding points. When the determination result is positive, information on the corresponding route is temporarily stored in Step S123. The stored information may be, for example, a combination of the desired riding points and the arrival times at the desired riding points. This information is referred to as operation schedule candidates in a riding time period.

In Steps S124 and S125, the same processes as performed in Steps S121 and S122 are performed on the desired alighting points. When the determination result of Step S125 is positive, information on the corresponding routes is temporarily stored in Step S126. The stored information may be, for example, a combination of the desired alighting points and the arrival times at the desired alighting points. This information is referred to as operation schedule candidates in an alighting time period. An operation schedule from a time at which all users ride to a time at which a first user alights on the next morning is not determined in Step S12.

When it is determined in Step S122 or S125 that there is no route on which the autonomously traveling vehicle 100 can arrive at the desired riding points (the desired alighting points) at designated times, it means that the lodging requests acquired from the users are not satisfied by only the selected autonomously traveling vehicle 100, and thus it is determined in Step S127 whether another autonomously traveling vehicle 100 can be added. Whether another autonomously traveling vehicle 100 can be added can be determined, for example, based on vehicle information which is managed by the vehicle information managing unit 2021.

When the determination result of Step S127 is negative, it is determined that the lodging requests of all the users cannot be satisfied and thus the process flow ends. When the lodging requests of other users can be satisfied by cancelling the lodging requests of some users, a notification indicating that the lodging request cannot be accepted is transmitted to only the some users and the processes flow illustrated in FIG. 6 may be restarted.

When the determination result of Step S127 is positive, the process flow progresses to Step S128, a user group including the some users serving as a reason for unsatisfaction of conditions in Step S122 or S125 is generated, a new autonomously traveling vehicle 100 is allocated to the group, and the process flow illustrated in FIG. 6 is restarted.

Figure 7:
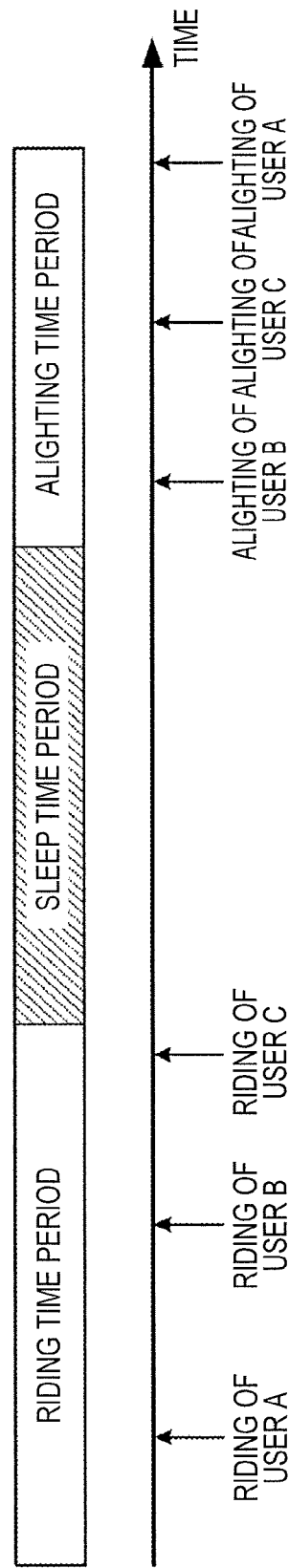
FIG. 7 is a diagram illustrating an operation time period of a mobile object.

Description will be continued with reference back to FIG. 3. FIG. 7 is a diagram illustrating times at which a plurality of users rides in an autonomously traveling vehicle 100 and times at which the users alights from the autonomously traveling vehicle 100 in a time series. Through the process of Step S12, candidates of an operation schedule of each autonomously traveling vehicle 100 (for example, points at which users ride and scheduled arrival times at the points) in the riding time period and the alighting time period illustrated in the drawing are determined.

Then, an operation schedule in a sleep time period is created for each autonomously traveling vehicle 100 which is operating in Step S13. As illustrated in FIG. 7, until the alighting time period comes in after the riding time period has elapsed (hereinafter referred to as a sleep time period), the traveling position of the autonomously traveling vehicle 100 is not limited. Therefore, in the first embodiment, the autonomously traveling vehicle 100 is caused to perform a task (hereinafter referred to as a sub-task) other than provision of a lodging service in the sleep time period.

Examples of the task other than provision of a lodging service include tasks which can be performed in an unmanned manner or in a semi-unmanned manner such as street monitoring or information collection, transportation of cargo, and retrieval of a person or a vehicle. When the autonomously traveling vehicle 100 includes an external display device, the autonomously traveling vehicle 100 may perform a task of displaying advertisement using the external display device. Whether a certain sub-task is to be performed in the sleep time period or areas or routes in which a sub-task is performed, and the like may be designated by a manager of the system. For example, the schedule creating unit 2022 determines that the autonomously traveling vehicle 100 performs a sub-task of "traveling in a designated area or route while displaying predetermined advertisement," and creates an operation schedule in the sleep time period. Alternatively, for example, the schedule creating unit 2022 may determine that the autonomously traveling vehicle 100 performs a sub-task of "loading luggage at a first location (such as a business office), traveling to another area, and unloading luggage at a second location," and creates an operation schedule in the sleep time period.

When there is a plurality of operation schedule candidates selected in Step S12, an operation schedule more suitable for the sleep time period can be selected. For example, the candidates of an operation schedule in the riding time period may be filtered such that a point at which a final user rides in the riding time period becomes closer to a point at which execution of a sub-task is started. The candidates of an operation schedule in the alighting time period may be filtered such that a point at which execution of a sub-task is ended becomes closer to a point at which a first user alights in the alighting time period.

When the process of Step S13 is completed, the operation instruction generating unit 2023 generates an operation instruction and transmits the generated operation instruction to the corresponding autonomously traveling vehicle 100. Specifically, an operation instruction in the riding time period, an operation instruction in the sleep time period, and an operation instruction in the alighting time period are generated. (A) of FIG. 8 illustrates an example of an operation instruction which is generated by the operation instruction generating unit 2023. The operation instruction which is generated by the operation instruction generating unit 2023 is transmitted to the autonomously traveling vehicle 100 via the communication unit 201 (Step S14).

In Step S15, the autonomously traveling vehicle 100 (the operation plan creating unit 1031) creates an operation plan based on the received operation instructions. For example, the autonomously traveling vehicle 100 creates an operation plan in which a plurality of users having transmitted a lodging request ride at the desired riding points, an operation plan in which a sub-task is performed, and an operation plan in which a plurality of users alights at the desired alighting points. (B) of FIG. 8 illustrates an example of an operation plan (a part) which is created by the operation instruction generating unit 2023.

The created operation plan is transmitted to the traveling control unit 1033 and operation is started (Step S16). During operation, transmission of position information or the like to the server 200 is also periodically performed.

As described above, in the mobile object system that provides a lodging service using an autonomously traveling vehicle according to the first embodiment, the server causes the autonomously traveling vehicle to perform different tasks in accordance with different operation instructions in the sleep time period and in other time periods. According to this embodiment, it is possible to provide a service using resources of an autonomously traveling vehicle as much as possible.

When the operation instruction is transmitted in Step S14, the server 200 may transmit information on the users or the user terminals 300 having transmitted a lodging request to the autonomously traveling vehicle 100 together. For example, information for authenticating the user terminals 300 correlated with the users may be transmitted to the autonomously traveling vehicle 100. According to this configuration, the autonomously traveling vehicle 100 (the facility managing unit 1034) can authenticate the users. Accordingly, for example, a user can check in/out the lodging equipment using a user terminal 300 or lock and unlock a private compartment corresponding to the user. The information for authenticating a user terminal 300 may be, for example, a password or may be an electronic one-time key.

Modified Example 1 of First Embodiment

In the first embodiment, an autonomously traveling vehicle 100 performs a service (a sub-task) other than the lodging service in the sleep time period. However, the autonomously traveling vehicle 100 does not need to perform a sub-task in the sleep time period. For example, after the riding time period has elapsed, the autonomously traveling vehicle 100 may travel to a predetermined parking place, and may be parked therein until the alighting time period comes in. In this case, the server 200 may generate an operation instruction indicating that "the autonomously traveling vehicle 100 travels to a predetermined parking place and is parked with air-conditioning operating by connection to a power supply until movement for allowing a first user to alight is started on the next day" as an operation instruction corresponding to the sleep time period. In order to enable this task, the server 200 may store information on places in which the autonomously traveling vehicle 100 can be parked.

Modified Example 2 of First Embodiment

Since the sleep time period is a time period in which users sleep, it is preferable to curb shaking of a vehicle as much as possible. In order to cope with this, parameters for automated driving may be changed to perform operation control with less shaking in the sleep time period and the other time periods. Examples of the parameters for automated driving include a parameter for allowable acceleration/deceleration and a parameter for designating a maximum speed, but are not limited thereto. For example, the maximum speed in automated driving may be set to be lower or an average speed may be set to be lower. In the sleep time period, control for actively selecting a route (a road) with less shaking may be performed.

Modified Examples

The above-mentioned embodiment is only an example and the disclosure can be appropriately modified without departing from the gist of the disclosure. For example, the processes or units which have been described above in the present disclosure can be freely combined as long as no technical contradictions arise.

A process which has been described to be performed by a single device may be distributed to and performed by a plurality of devices. Alternatively, processes which have been described to be performed by different devices may be performed by a single device. In a computer system, by what hardware configuration (server configuration) each function is to be embodied can be flexibly changed.

The disclosure can also be embodied by supplying a computer program having the functions described in the above-mentioned embodiment mounted therein to a computer and causing one or more processors of the computer to read and execute the computer program. Such a computer program may be provided to the computer via a non-transitory computer-readable storage medium which can be connected to a system bus of the computer or may be provided to the computer via a network. Examples of the non-transitory computer-readable storage medium include an arbitrary type of disk such as a magnetic disk (such as a Floppy (registered trademark) disk or a hard disk drive (HDD)) or an optical disc (such as a CD-ROM, a DVD disc, or a Blu-ray disc) and an arbitrary type of medium which is suitable for storing electronic commands such as a read only memory (ROM), a random access memory (RAM), an EPROM, an EEPROM, a magnetic card, a flash memory, or an optical card.

What is claimed is:

1. An information processing device that controls a mobile object including lodging facilities with a plurality of compartments, the information processing device comprising a control unit programmed to:
    create an operation schedule including a first period in which movement for allowing a plurality of users to ride in or alight from the mobile object is a main purpose and a second period in which riding and alighting of the users are not required and sleeping in the lodging facilities is a main purpose, based on lodging requests including riding places, riding times, alighting places and alighting times of users acquired by communication from a plurality of user terminals; and
    generate an operation instruction for executing traveling control on the mobile object with less shaking in the second period than in the first period; and
    transmitting the operation instruction to the corresponding mobile object.

2. The information processing device according to claim 1, wherein the second period is included in a period until a first user out of the plurality of users alights from the mobile object on the next day after a final user has ridden in the mobile object.

3. The information processing device according to claim 1, wherein the control unit is configured to generate the operation instruction for designating an operation speed which is lower in the second period than in the first period.

4. The information processing device according to claim 1, wherein the mobile object includes equipment that provides a service other than lodging equipment, and
wherein the control unit is configured to generate the operation instruction for causing the mobile object to additionally perform the service other than lodging in the second period.

5. The information processing device according to claim 1, wherein the control unit is configured to acquire the lodging requests including a desired riding point, a desired alighting point, and a desired alighting time from the plurality of users and to create the operation schedule satisfying all the lodging requests.

6. A mobile object that includes lodging facilities with a plurality of compartments and operates based on an operation instruction which is received from a server, the mobile object comprising a control unit programmed to:
receive the operation instruction from the server; and
allow a plurality of users to ride in the mobile object and travel based on the received operation instruction,
wherein the control unit is programmed to execute a traveling control on the mobile object with less shaking in a second period, in which riding and alighting of the users are not required and sleeping in the lodging facilities is a main purpose, than in a first period, in which movement for allowing a plurality of users to ride in or alight from the mobile object is a main purpose.

7. The mobile object according to claim 6, wherein each of the plurality of compartments of the lodging facilities is able to be unlocked based on a result of communication with a user terminal correlated with each of the plurality of users.

8. The mobile object according to claim 6, wherein the control unit is configured to operate at a speed which is lower in the second period than in the first period.

9. The mobile object according to claim 6, further comprising equipment that provides a service other than lodging equipment,
wherein the control unit is configured to additionally perform the service other than lodging equipment in the second period.

* * * * *